(12) United States Patent
Dutton

(10) Patent No.: US 7,424,718 B2
(45) Date of Patent: *Sep. 9, 2008

(54) METHOD AND SYSTEM FOR PRESENTING EVENTS ASSOCIATED WITH RECORDED DATA EXCHANGED BETWEEN A SERVER AND A USER

(75) Inventor: Faron Dutton, Cumming, GA (US)

(73) Assignee: Verint Americas Inc., Roswell, GA (US)

(*) Notice: Subject to any disclaimer, the term of this patent is extended or adjusted under 35 U.S.C. 154(b) by 117 days.

This patent is subject to a terminal disclaimer.

(21) Appl. No.: 11/389,471

(22) Filed: Mar. 23, 2006

(65) Prior Publication Data

US 2006/0200832 A1    Sep. 7, 2006

Related U.S. Application Data

(63) Continuation of application No. 10/136,705, filed on Apr. 30, 2002, which is a continuation-in-part of application No. 10/061,469, filed on Jan. 31, 2002, now Pat. No. 7,219,138, which is a continuation-in-part of application No. 10/061,489, filed on Jan. 31, 2002, now abandoned, and a continuation-in-part of application No. 10/061,491, filed on Jan. 31, 2002, and a continuation-in-part of application No. 10/058,911, filed on Jan. 28, 2002, now abandoned.

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 17/50 | (2006.01) |
| G06F 11/34 | (2006.01) |
| H04M 3/00 | (2006.01) |
| H04M 5/00 | (2006.01) |
| H04M 3/51 | (2006.01) |

(52) U.S. Cl. ............. 719/318; 379/265.01; 379/265.09; 705/7; 705/11; 715/704

(58) Field of Classification Search ................ 709/204, 709/227; 379/265.01–265.09, 88.01–88.04; 705/7–11; 715/704; 704/231, 246, 270, 704/275; 719/318

See application file for complete search history.

(56) References Cited

U.S. PATENT DOCUMENTS 3,594,919 A    7/1971    De Bell et al.

(Continued)

OTHER PUBLICATIONS

"Customer Spotlight: Navistar International," Web page, unverified print date of Apr. 1, 2002.

(Continued)

*Primary Examiner*—Meng-Ai An
*Assistant Examiner*—Qing-Yuan Wu
(74) *Attorney, Agent, or Firm*—Lawrence A. Aaronson

(57) ABSTRACT

Events associated with recorded data exchanged between at least one user and at least one server are presented to a user. A set of events associated with the recorded data is defined, and each event within the set is represented by an event identifier, e.g., a time stamp. Each event identifier is associated with portions of the recorded data that correspond to the event represented by the event identifier. An event is selected for presentation by selecting the event identifier associated with a portion of the data that corresponds to that event.

11 Claims, 14 Drawing Sheets

U.S. PATENT DOCUMENTS

| | | | |
|---|---|---|---|
| 3,705,271 | A | 12/1972 | De Bell et al. |
| 4,684,349 | A | 8/1987 | Ferguson et al. |
| 5,101,402 | A | 3/1992 | Chiu et al. |
| 5,267,865 | A | 12/1993 | Lee et al. |
| 5,311,422 | A | 5/1994 | Loftin et al. |
| 5,511,165 | A | 4/1996 | Brady et al. |
| 5,526,407 | A | 6/1996 | Russell et al. |
| 5,581,614 | A | 12/1996 | Ng et al. |
| 5,597,312 | A | 1/1997 | Bloom et al. |
| 5,710,591 | A | 1/1998 | Bruno et al. |
| 5,717,879 | A | 2/1998 | Moran et al. |
| 5,742,736 | A | 4/1998 | Haddock |
| 5,790,798 | A | 8/1998 | Beckett et al. |
| 5,809,250 | A | 9/1998 | Kisor |
| 5,825,869 | A | 10/1998 | Brooks et al. |
| 5,926,836 | A | 7/1999 | Blumenau |
| 5,958,016 | A | 9/1999 | Chang et al. |
| 5,964,836 | A | 10/1999 | Rowe et al. |
| 5,970,455 | A | 10/1999 | Wilcox et al. |
| 5,978,648 | A | 11/1999 | George et al. |
| 6,009,429 | A | 12/1999 | Greer et al. |
| 6,014,134 | A | 1/2000 | Bell et al. |
| 6,014,647 | A | 1/2000 | Nizzari et al. |
| 6,018,619 | A | 1/2000 | Allard et al. |
| 6,035,332 | A | 3/2000 | Ingrassia et al. |
| 6,038,544 | A | 3/2000 | Machin et al. |
| 6,039,575 | A | 3/2000 | L'Allier et al. |
| 6,057,841 | A | 5/2000 | Thurlow et al. |
| 6,061,798 | A | 5/2000 | Coley et al. |
| 6,076,099 | A | 6/2000 | Chen et al. |
| 6,078,894 | A | 6/2000 | Clawson et al. |
| 6,108,711 | A | 8/2000 | Beck et al. |
| 6,115,751 | A | 9/2000 | Tam et al. |
| 6,122,665 | A | 9/2000 | Bar et al. |
| 6,122,668 | A | 9/2000 | Teng et al. |
| 6,138,139 | A | 10/2000 | Beck et al. |
| 6,144,991 | A | 11/2000 | England |
| 6,146,148 | A | 11/2000 | Stuppy |
| 6,154,771 | A | 11/2000 | Rangan et al. |
| 6,157,808 | A | 12/2000 | Hollingsworth |
| 6,171,109 | B1 | 1/2001 | Ohsuga |
| 6,182,094 | B1 | 1/2001 | Humpleman et al. |
| 6,195,679 | B1 | 2/2001 | Bauersfeld et al. |
| 6,201,948 | B1 | 3/2001 | Cook et al. |
| 6,211,451 | B1 | 4/2001 | Tohgi et al. |
| 6,225,993 | B1 | 5/2001 | Lindblad et al. |
| 6,230,197 | B1 | 5/2001 | Beck et al. |
| 6,236,977 | B1 | 5/2001 | Verba et al. |
| 6,244,758 | B1 | 6/2001 | Solymar et al. |
| 6,286,030 | B1 | 9/2001 | Wenig et al. |
| 6,286,046 | B1 | 9/2001 | Bryant |
| 6,288,753 | B1 | 9/2001 | DeNicola et al. |
| 6,289,340 | B1 | 9/2001 | Purnam et al. |
| 6,301,462 | B1 | 10/2001 | Freeman et al. |
| 6,301,573 | B1 | 10/2001 | McIlwaine et al. |
| 6,324,282 | B1 | 11/2001 | McIllwaine et al. |
| 6,336,093 | B2 | 1/2002 | Fasciano |
| 6,347,374 | B1 | 2/2002 | Drake et al. |
| 6,351,467 | B1 | 2/2002 | Dillon |
| 6,370,574 | B1 | 4/2002 | House et al. |
| 6,404,857 | B1 | 6/2002 | Blair et al. |
| 6,408,064 | B1 | 6/2002 | Federov et al. |
| 6,418,471 | B1 | 7/2002 | Shelton et al. |
| 6,421,427 | B1 | 7/2002 | Hill et al. |
| 6,437,818 | B1 | 8/2002 | Ludwig et al. |
| 6,445,776 | B1 | 9/2002 | Shank et al. |
| 6,453,345 | B2 | 9/2002 | Trcka et al. |
| 6,459,787 | B2 | 10/2002 | McIllwaine et al. |
| 6,493,758 | B1 | 12/2002 | McLain |
| 6,502,131 | B1 | 12/2002 | Vaid et al. |
| 6,510,220 | B1 | 1/2003 | Beckett, II et al. |
| 6,510,469 | B1 | 1/2003 | Starnes et al. |
| 6,535,909 | B1 | 3/2003 | Rust |
| 6,542,602 | B1 | 4/2003 | Elazar |
| 6,543,004 | B1 | 4/2003 | Cagle et al. |
| 6,546,405 | B2 | 4/2003 | Gupta et al. |
| 6,583,806 | B2 | 6/2003 | Ludwig et al. |
| 6,584,179 | B1 | 6/2003 | Fortier et al. |
| 6,603,854 | B1 | 8/2003 | Judkins et al. |
| 6,604,093 | B1 | 8/2003 | Etzion et al. |
| 6,606,657 | B1 | 8/2003 | Zilberstein et al. |
| 6,665,644 | B1 | 12/2003 | Kanevsky et al. |
| 6,674,447 | B1 | 1/2004 | Chiang et al. |
| 6,683,633 | B2 | 1/2004 | Holtzblatt et al. |
| 6,697,858 | B1 | 2/2004 | Ezerzer et al. |
| 6,724,887 | B1 | 4/2004 | Eilbacher et al. |
| 6,738,456 | B2 | 5/2004 | Wrona et al. |
| 6,757,361 | B2 | 6/2004 | Blair et al. |
| 6,772,214 | B1 | 8/2004 | McClain et al. |
| 6,772,396 | B1 | 8/2004 | Cronin et al. |
| 6,775,377 | B2 | 8/2004 | McIllwaine et al. |
| 6,785,370 | B2 | 8/2004 | Glowny et al. |
| 6,792,575 | B1 | 9/2004 | Samaniego et al. |
| 6,810,414 | B1 | 10/2004 | Brittain |
| 6,820,083 | B1 | 11/2004 | Nagy et al. |
| 6,823,384 | B1 | 11/2004 | Wilson et al. |
| 6,870,916 | B2 | 3/2005 | Henrikson et al. |
| 6,901,438 | B1 | 5/2005 | Davis et al. |
| 6,915,314 | B2 | 7/2005 | Jackson et al. |
| 6,937,706 | B2 | 8/2005 | Bscheider et al. |
| 6,959,078 | B1 | 10/2005 | Eilbacher et al. |
| 6,965,886 | B2 | 11/2005 | Govrin et al. |
| 6,993,494 | B1 | 1/2006 | Boushy et al. |
| 7,003,517 | B1 | 2/2006 | Seibel et al. |
| 7,047,297 | B2 | 5/2006 | Huntington et al. |
| 2001/0000962 | A1 | 5/2001 | Rajan |
| 2001/0014143 | A1 | 8/2001 | Kuhn |
| 2001/0032335 | A1 | 10/2001 | Jones |
| 2001/0043697 | A1 | 11/2001 | Cox et al. |
| 2002/0038363 | A1 | 3/2002 | MacLean |
| 2002/0052948 | A1 | 5/2002 | Baudu et al. |
| 2002/0065911 | A1 | 5/2002 | Von Klopp et al. |
| 2002/0065912 | A1 | 5/2002 | Catchpole et al. |
| 2002/0112048 | A1 | 8/2002 | Gruyer et al. |
| 2002/0128925 | A1 | 9/2002 | Angeles |
| 2002/0143925 | A1 | 10/2002 | Pricer et al. |
| 2002/0165954 | A1 | 11/2002 | Eshghi et al. |
| 2003/0055883 | A1 | 3/2003 | Wiles et al. |
| 2003/0079020 | A1 | 4/2003 | Gourraud et al. |
| 2003/0140121 | A1 | 7/2003 | Adams |
| 2003/0144900 | A1 | 7/2003 | Whitmer |
| 2003/0154240 | A1 | 8/2003 | Nygren et al. |
| 2004/0100507 | A1 | 5/2004 | Hayner et al. |
| 2004/0165717 | A1 | 8/2004 | McIlwaine et al. |
| 2004/0249650 | A1 | 12/2004 | Freedman et al. |
| 2005/0138560 | A1 | 6/2005 | Lee et al. |
| 2005/0240656 | A1 | 10/2005 | Blair |
| 2006/0165003 | A1 | 7/2006 | Partridge |

OTHER PUBLICATIONS

"DKSystems Integrates QM Perception with OnTrack for Training," Web page, unverified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"PriceWaterhouseCoopers Case Study: The Business Challenge," Web page, unverified cover date of 2000.

Abstract, net.working: "An Online Webliography," *Technical Training* pp. 4-5 (Nov./Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of Al in Education," *AMC Crossroads* 1:1-13 (Fall 1996), Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," *Communications ACM* 45(5):62-63 (May 2002).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosky et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date Apr. 12, 2002, unverified cover date of 1995.
Calvi and De Bra, "Improving the Usability of Hypertext Courseware through Adaptive Linking," *ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Apr. 12, 2002, unverified cover date of 2001.
Cole-Gomolski, "New ways to manage E-Classes," *Computerworld* 32(48):4344 (Nov. 30, 1998).
Cross, "Sun Microsystems—the SunTAN Story," Internet Time Group 8 (©2001).
Cybulski and Linden, "Teaching Systems Analysis and Design Using Multimedia and Patterns," unknown date, unknown source.
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2)57-64 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning*, THINQ Limited, London, Version 1.0 (2000).
Eline, "A Trainer's Guide to Skill Building," *Technical Training* 34-41 (Sep./Oct. 1998).
Eline, "Case Study: Bridging the Gap in Canada's IT Skills," *Technical Skills and Training* pp. 23-25 (Jul. 1997).
Eline, "Case Study: IBT's Place in the Sun," *Technical Training* pp. 12-17 (Aug./Sep. 1997).
Fritz, "CB templates for productivity: Authoring system templates for trainers," *Emedia Professional* 10(8):6876 (Aug. 1997).
Fritz, "ToolBook II: Asymetrix's updated authoring software tackles the Web," *Emedia Professional* 10(2):102106 (Feb. 1997).

Gibson et al., "A Comparative Analysis of Web-Based Testing and Evaluation Systems," pp. 1-8, Web page, unverified print date of Apr. 11, 2002.
Hallberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3):5053 (Mar. 1998).
Larson, "Enhancing Performance Through Customized Online Learning Support," *Technical Skills and Training* pp. 25-27 (May/Jun. 1997).
Linton et al., "OWL: A Recommender System for Organization-Wide Learning," *Educational Technical Society* 3(1):62-76 (2000).
Lucadamo and Cheney, "Best Practices in Technical Training," *Technical Training* pp. 21-26 (Oct. 1997).
McNamara, "Monitoring Solutions: Quality Must Be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," *Trans. IEICE* E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc., USA.
Nelson et al., "The Assessment of *End-User Training Needs*," *Communications ACM* 38(7):27-39 (Jul. 1995).
O'Herron, "CenterForce Technologies' CenterForce Analyzer," Web page, unverified print date of Mar. 20, 2002, unverified cover date of Jun. 1, 1999.
O'Roark, "Basic Skills Get a Boost," *Technical Training* pp. 10-13 (Jul./Aug. 1998).
Pamphlet, "On Evaluating Educational Innovations[1]," authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web product," Web page, unverified print date of Apr. 1, 2002.
Phaup, "QM Perception™ Links with Integrity Training's WBT Manager™ to Provide Enhanced Assessments for Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available to high-volume users," Web page, unverified print date of Apr. 1, 2002, unverified cover date of May 6, 1996.

Piskurich, "Now-You-See-'Em, Now-You-Don't Learning Centers," *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," *Technical Skills and Training* pp. 6-8 (May/Jun. 1995).

Stormes, "Case Study: Restructuring Technical Training Using ISD," *Technical Skills and Training* pp. 23-26 (Feb./Mar. 1997).

Tennyson, "Artificial Intelligence Methods in Computer-Based Instructional Design," *Journal of Instructional Development* 7(3):17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *InfoWorld* 20(47):6467 (Nov. 23, 1998).

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Bringing eQuality to eBusiness".

Witness Systems promotional brochure for eQuality entitled "Building Customer Loyalty Through Business-Driven Recording of Multimedia Interactions in your Contact Center," (2000).

|>    Play
||    Pause
□    Stop
|<<    Skip to previous silence
<<    Rewind
>>    Fast Forward
>>|    Skip over silence

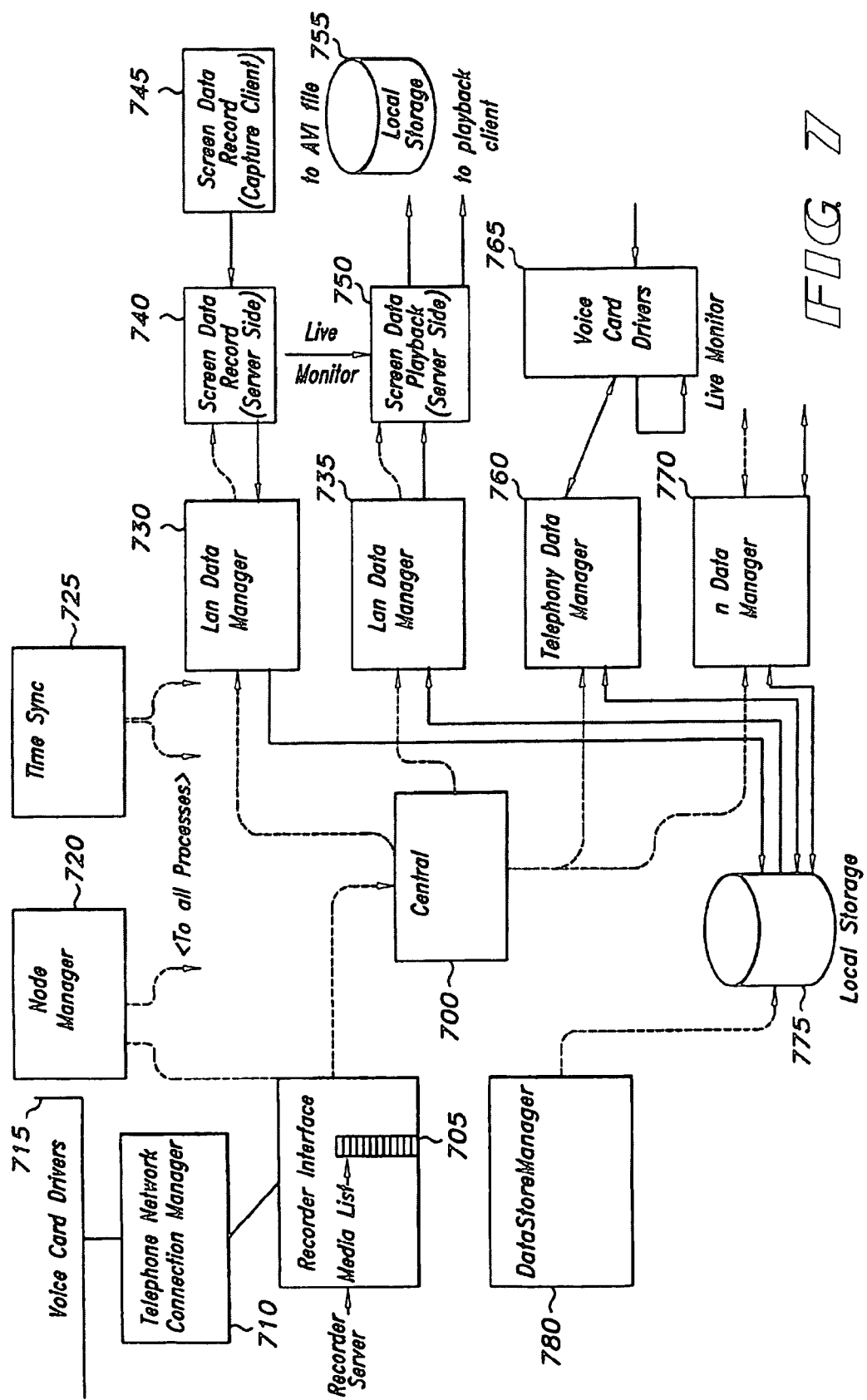

METHOD AND SYSTEM FOR PRESENTING EVENTS ASSOCIATED WITH RECORDED DATA EXCHANGED BETWEEN A SERVER AND A USER

CROSS REFERENCE TO RELATED APPLICTIONS

This application is a continuation of, and claims priority to, U.S. application Ser. No. 10/136,705, filed on Apr. 30, 2002, which is a continuation-in-part of commonly assigned U.S. patent application Ser. No. 10/061,469, filed Jan. 31, 2002, now U.S. Pat. No. 7,219,138, a continuation-in-part of U.S. patent application Ser. No. 10/061,489, filed Jan. 31, 2002, now abandoned, and a continuation-in-part of U.S. patent application Ser. No. 10/061,491, filed Jan. 31, 2002, all of which are hereby incorporated by reference. This application is also a continuation-in-part of commonly assigned U.S. patent application Ser. No. 10/058,911, now abandoned, filed Jan. 28, 2002 and hereby incorporated by reference. Also, this application is related to copending U.S. application Ser. No. 11/388,944, entitled "Methods and Systems for Categorizing and Cataloguing Recorded Interactions", filed Mar. 23, 2006, U.S. application Ser. No. 11/388,854, entitled "Method and System for Selectively Dedicating Resources for Recording Data Exchanged Between Entities Attached to a Network", filed Mar. 23, 2006, and U.S. application Ser. No. 10/136,718, now U.S. Pat. No. 7,149,788, entitled "Method and System for Providing Access to Captured Multimedia Data from a Multimedia Player", filed on Apr. 30,2002, and hereby incorporated by reference.

BACKGROUND

The present invention is directed to a method and system for presenting recorded data. More particularly, the present invention is directed to a method and system for presenting events associated with recorded data exchanged between a server and a user.

For systems employing interactions between a user and server, it is often desirable to be able to view the interactions, ideally in a manner that is transparent to the user. This is particularly desirable in a context such as sales, customer service, and e-commerce, where interactions between customers and a service provider are important indicators of customer satisfaction.

Attempts have been made to recreate interactions between a user and a server. For example, click stream analysis procedures have been used to recreate interactions between a web user and a web service provider. This type of procedure is analogous to reviewing and analyzing the script to a movie. While this procedure reveals some information about the interaction between the server and the user, it does not provide a clear tangible picture of special effects, the environment, chemistry between the user and the server, etc.

Other attempts have been made to replay recorded interactions between a server and a user. However, these attempts are typically implemented at the server and are thus suitable only for a particular type of server. The format into which the data is recorded is typically not accessible by a large number of users using conventional servers. Also, the recorded exchanges often contain multimedia data, e.g., text and audio, which needs to be synchronized.

In addition, these approaches typically do not distinguish between interactions that are considered important and interactions that are not important. Thus, a lot of time and resources are wasted on replaying unimportant recorded interactions.

Also, it may be important for users to be notified when certain events occur, e.g., when certain data is recorded, and to be able to search for recorded data associated with the events.

There is thus a need for a technique for providing access to multimedia data captured during exchanges between and a web server and a user. There is also a need for providing for notification to users of event occurrence and for enabling users to locate recorded data associated with the events.

SUMMARY

It is an object of the present invention to enable a user to locate recorded data associated with events.

According to exemplary embodiments, these and other objects are met by a method and system for presenting events associated with recorded data exchanged between at least one user and at least one server. A set of events associated with the recorded data is defined, and each event within the set is represented by an event identifier, e.g., a time stamp. Each event identifier is associated with portions of the recorded data that correspond to the event represented by the event identifier. An event is selected for presentation by selecting the event identifier associated with a portion of the data that corresponds to that event.

Further objects, advantages and features of the present invention will become more apparent when reference is made to the following description taken in conjunction with the accompanying drawings.

BRIEF DESCRIPTION OF THE DRAWINGS

FIGS. 6A-6G illustrate exemplary screens used for exporting one or more contacts; and FIG. 7 illustrates an exemplary system for synchronizing multimedia data for playback and export.

DETAILED DESCRIPTION

According to exemplary embodiments, access is provided to a multimedia player of data exchanged between a server and a user. In the following description, the server is referred to as a web server, and the user is referred to as a web browser. It will be appreciated, however, that the invention may be applicable to other types of servers and users.

Figure 1A:
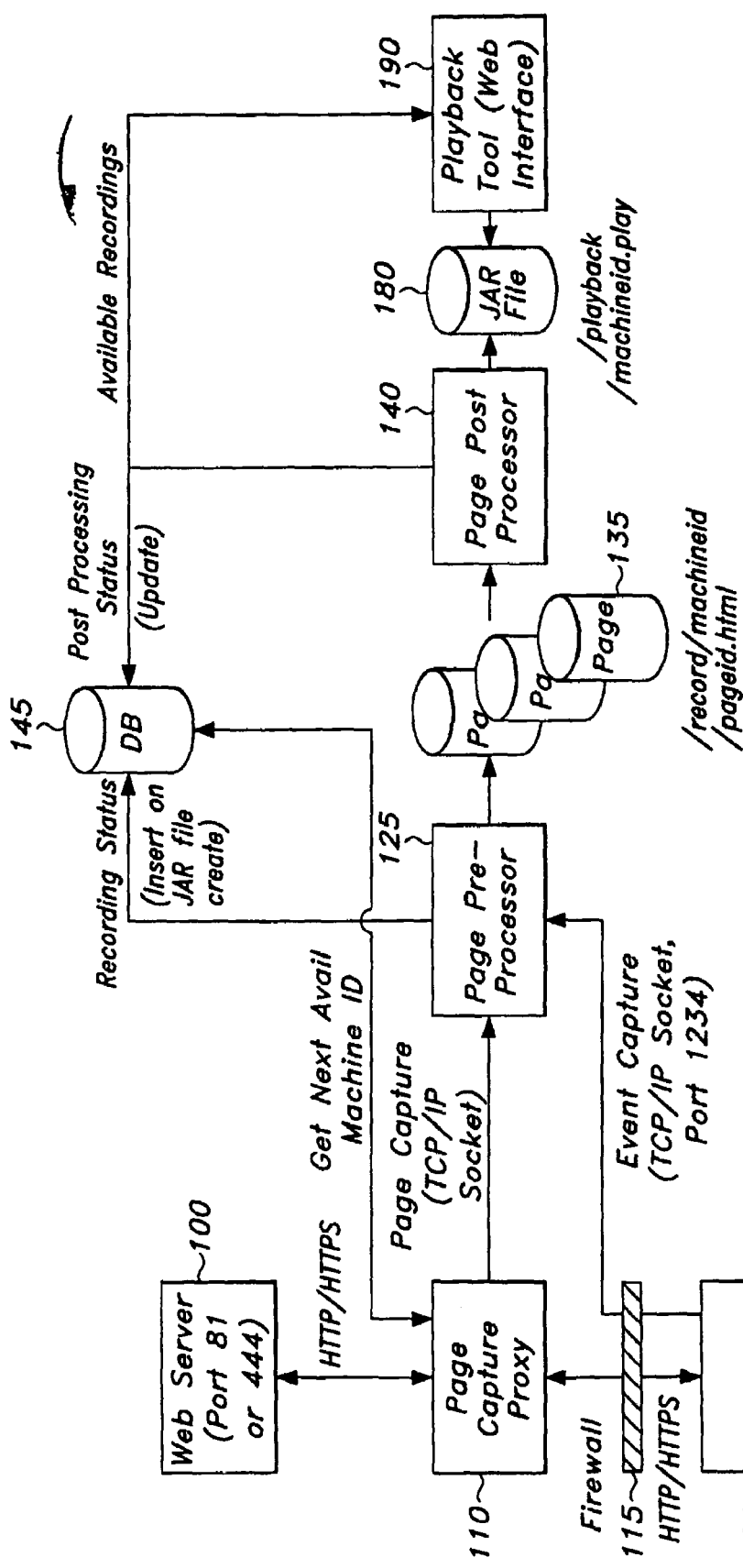
FIG. 1A illustrates an exemplary system for capturing, recording, and playing back data according to an exemplary embodiment.

FIG. 1A illustrates an exemplary system for capturing, recording, and playing data in which the invention may be implemented. The system includes a server, such as a web server 100, a data capturing module, such as a page capture module 110, and a user, such as a web browser 120.

Although only one web server 100, page capture module 110, and web browser 120 are depicted in FIG. 1, it will be appreciated that the invention is applicable to any number of servers, data capturing modules, and users.

The web browser 120 may be implemented in a personal computer, a telephone, etc. The web server 100 may be implemented as a server supporting any operating system, e.g., Unix, Linux, NT or Windows 2000.

The page capture module 110 is arranged between the web server 100 and the web browser 120. For security purposes, a firewall 115 may separate the web browser 120 and the page capture module 110.

The page capture module 110 operates independently from the web server 100 and the web browser 120. Thus, the page capture module 110 does not need to be customized for each type of web server but may be used with any web server, supporting any operating system.

Although the page capture module 110 operates independently from the web server 100 and the web browser, it may be implemented in the same device as the web server 100 or the web browser 120.

The page capture module 110 captures pages and other data exchanged between the web server 100 and the browser 120. Pages and other data may be captured continually or at designated intervals or time windows. The page capture module 110 may also record these pages and other data, or recording may be performed in a separate recorder server connected to the page capture module.

Each web browser 120 is assigned a unique machine identity (ID) by the web server 100. A persistent machine ID cookie may be created by the web server 110 and stored at the web browser 120 for this purpose. All pages served to a particular web browser 120 are identified and grouped by the machine ID.

Although the module 110 is described as a page capture module, according to exemplary embodiments, other types of data may also be captured. For example, events and attributes may be captured. Attributes may be captured in a manner similar to that in which pages are captured, as described above.

For event capturing, according to an exemplary embodiment, an event capture module captures user side events and delivers these to the page capture module 110. The event capture module may be implemented as an applet 130 that is downloaded to the web browser 120. Although shown as a separate component, the event capture applet 130 is stored at the browser, with parameters such as the web browser machine ID, the host Internet Protocol (IP) address, and the current page name. The event capture applet 130 may be notified, for example, by JavaScript embedded in the current page, whenever an event needs to be recorded. The event capture applet 130 records events such as: page load, page unload, page scroll, page resize, and browser exit. The event capture applet 130 sends captured events to the page capturing module 110 via, for example, a Transmission Control Protocol/Internet Protocol (TCP/IP) socket connection on port 80 (or port 443 for secure exchanges).

Pages and other data captured during exchanges between the web server 100 and the web browser 120 at the page capture module 110 are sent from the page capturing module 110 to a page preprocessor 125 via, e.g., a TCP/IP socket.

According to an exemplary embodiment, each captured page is assigned a unique page ID and is associated with a specific browser user machine ID. Each page may also contain the date and time that the page was captured and the page status (recording, processing, playback, etc.) After pages are captured, this information is extracted from the captured page, and a new record is inserted into a database 145.

The page preprocessor 125 acts as a recorder server and stores the captured data in a device such as a database 145. The pages 135 are then passed on to the page post-processor 140. Alternatively, the page capturing module 110 may perform this recording. To reduce the amount of storage necessary, only predetermined portions of data may be stored, e.g., the request portion or the response portion. Also, only data satisfying predetermined rules, e.g., rules indicating timing, may be stored. When the captured pages are recorded, identifying information may also be recorded, e.g., a session record ID, a date/time of recording, a machine ID, etc.

The page capturing module and page preprocessor are described in more detail in the afore-mentioned U.S. patent application Ser. No. 10/061,469, filed Jan. 31, 2002, now U.S. Pat. No. 7,219,138.

A post-processing module 140 determines which captured data satisfies predefined rules, e.g., business rules, and records this data in a playback database 180, such as a JAR file. The database 145 is updated to indicate what captured data has been selected and recorded for playback. The post-processing module is described in further retail below with reference to FIG. 1B.

A playback tool 190 selects recorded data from the database 180, using the information in the database 145. The playback module 190 controls playback of the data. The data may be displayed, for example, in a search frame for the web server or the browser.

Although not shown in the interest of simplifying the illustrations, it will be appreciated that the system in FIG. 1A may also include other components, e.g., configuration files used for processing and log files use for storing information for debugging, etc.

According to an exemplary embodiment, a user is allowed to search for, select and playback a recorded browser session using the playback module 190. The playback module 190 assembles a session of recordings selected by the user and plays back the session. The playback module may be implemented using, e.g., Netscape 4.5x and above browser or an Internet Explorer 4.x and above browser. More details are provided for searching, selecting, and playing of a recorded browser session in the afore-mentioned U.S. patent application Ser. No. 10/061,491.

Figure 1B:
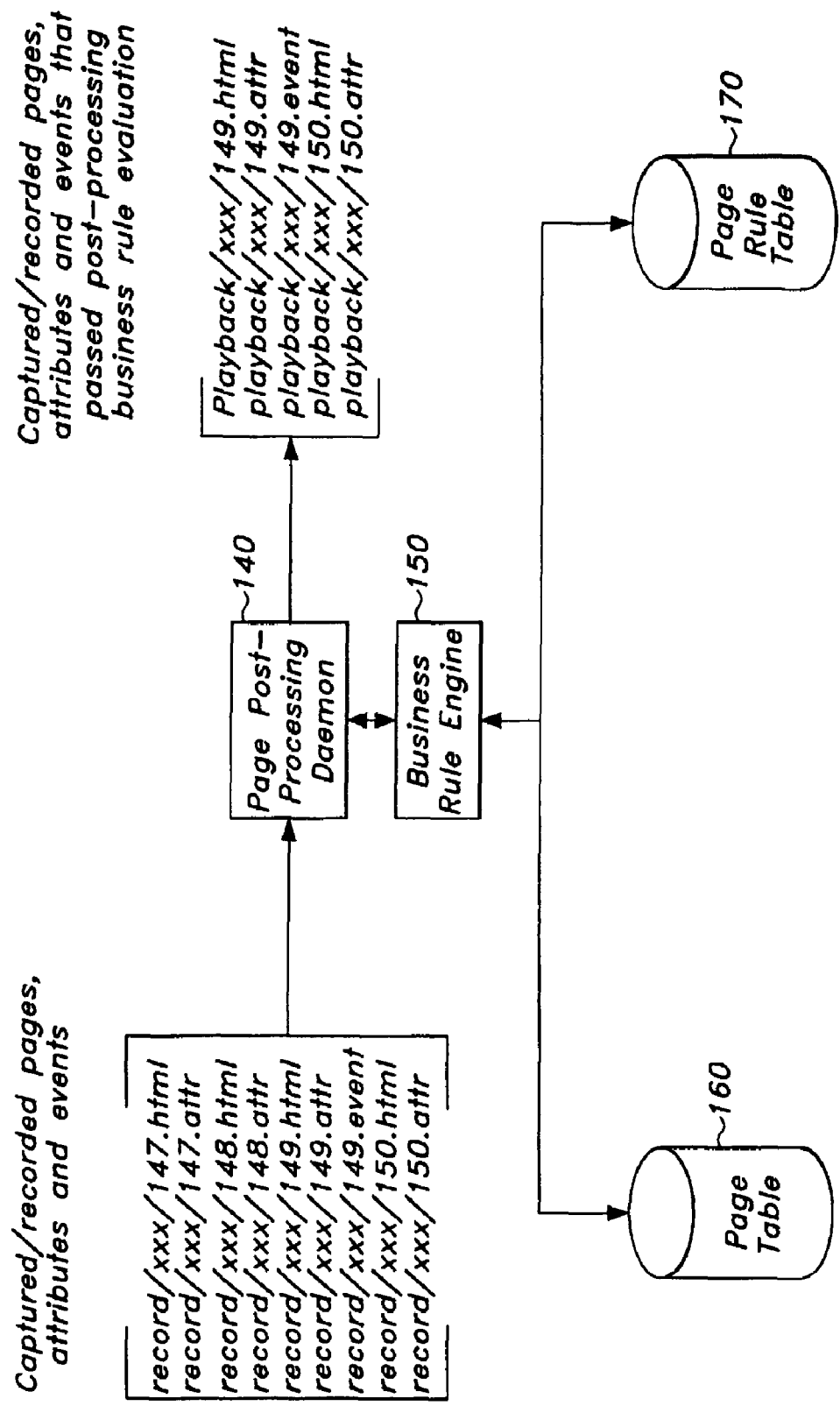
FIG. 1B illustrates in detail an exemplary system for recording data.

FIG. 1B illustrates in detail an exemplary system for processing captured data according to an exemplary embodiment. Captured and recorded pages, attributes, and events are fed to a page post-processing program running on a page post-processor 140. A business rules engine 150 delivers business rules to the post-processor 140 that evaluates the captured/recorded pages to determine whether they satisfy the business rules.

According to exemplary embodiments, business rules are applied to the recorded data in the business rule engine 150 to determine whether a page should be saved for playback. A business rule may be defined as a statement that defines or constrains some aspect of a business. The business rule asserts business structure or controls or influences the behavior of the business.

Data from a page table database 160 and a page rule table database 170 may be used in the evaluation by the business rule engine 150. Pages that satisfy the business rules are recorded for future playback. The page table and page rule database are updated after post-processing.

An example of a comparison of business rule with captured data may be determining whether the captured data is an interaction resulting in a sale greater than a predetermined number of dollars, determining whether an interaction was longer than a predetermined number of minutes, etc. As another example, a business rule may state that the current page is to be recorded and all previous pages for that machine ID in that session. Also, a business rule comparison may be in the form of voice recognition.

According to exemplary embodiments pages that do not satisfy the business rules are deleted.

Page post-processing is described in more detail in the afore-mentioned U.S. patent application Ser. No. 10/061,489, filed Jan. 31, 2002, now abandoned.

Figure 2A:
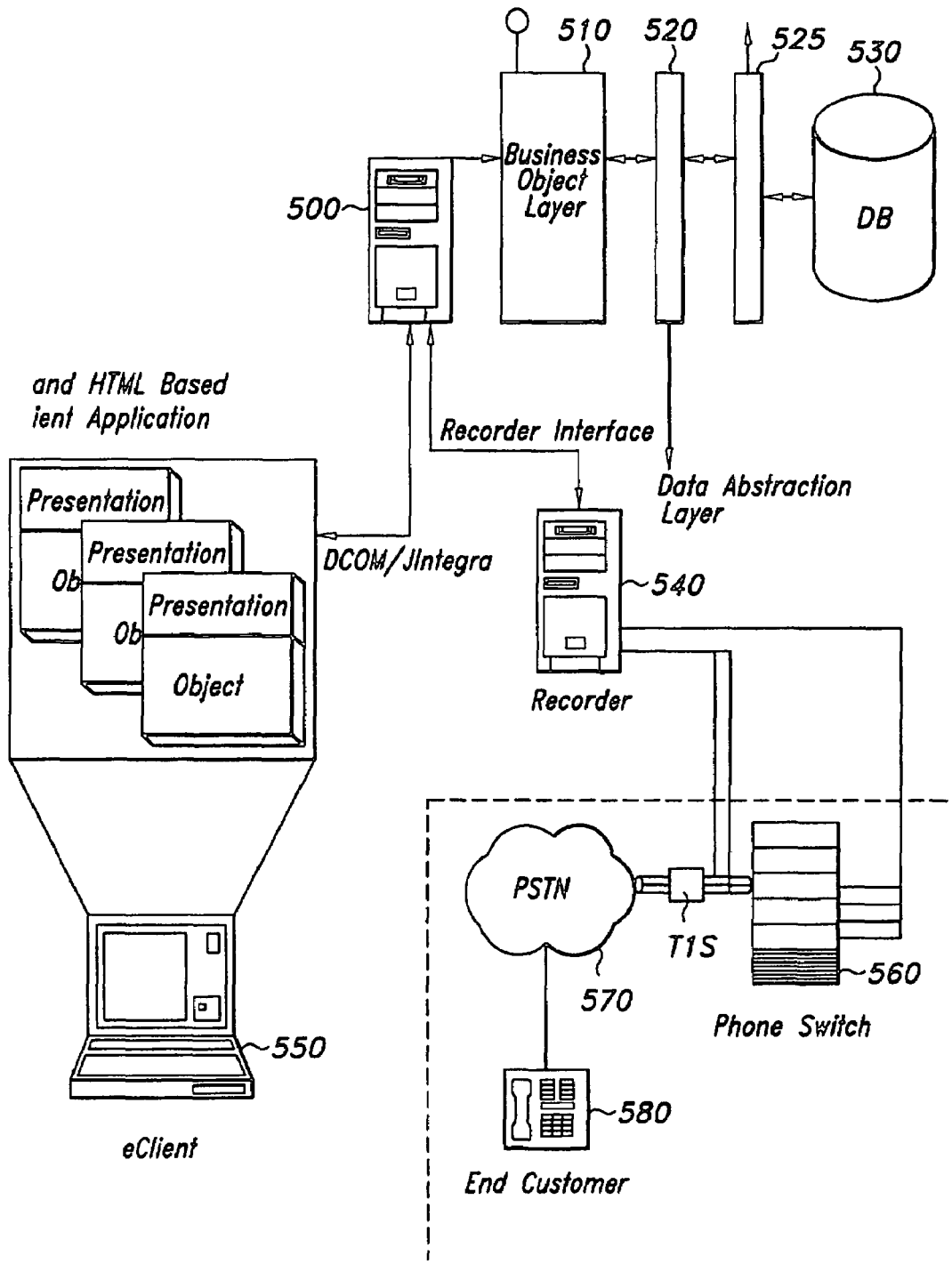
FIGS. 2A and 2B illustrate exemplary systems in which the invention may be implemented.

FIG. 2A illustrates an exemplary implementation of a system for capturing, recording, storing, and playing back data exchanged between a user and a server. According to an exemplary embodiment, business rules are applied to captured data, e.g., captured pages, using an applications server such as the server 500 shown in FIG. 2A. The server 500 may be implemented as a Component Object Model (COM) based server.

According to an exemplary embodiment, the server 500 includes a business rules engine, such as the engine 150 shown in FIG. 1B, an editor, a scheduled rules processor, a business object layer (BOL) 510, a data abstraction layer (DAL) 520 and 525 and a repository or database 530. Alternatively, the database 530 may included as a separate entity, e.g., if a large load is expected.

Data exchanged between the user and the server may include one or more contacts. According to an exemplary embodiment, a contact may be considered an interaction between, e.g., an agent within the same enterprise as the server and a user outside the enterprise. In addition to playing back data in sessions as described above, captured data may be played back as one or more contacts.

A contact may include one or more events and some content representing contacts in a machine readable form. The events may include occurrences associated with entities external to the enterprise, such as occurrences associated with Computer Telephony Integration (CTI), telephony, or speech recognition. Also, the events may include occurrences within the enterprise and occurrences associated with user-initiated annotations.

Attributes of contacts and metadata may be stored in the database 530, as well as business rule data populated and manipulated by the editor. The server 500 communicates with the database 530 to obtain the business rules. The engine 150 applies the business rules to the captured data and communicates with a recorder server 540 for recording the captured data that satisfies predetermined business rules. The BOL 510 interfaces with both the business rule editor applet and the DAL 520 and 525 to manage traffic to and from the database 530.

According to an exemplary embodiment, business rules may be added, deleted, copied, pasted, and or modified by a user, such as a supervisor, using the business rules editor implemented in the server 500 shown FIG. 2A. The server communicates with a client computer, such as the computer 550. The client computer may be implemented as a browser-based application, utilizing Java applets and HTML, and interfacing with some COM-Java bridging tool (Jintegra or R-JAX) to allow the Java-based client to communicate with the COM-based server. The business rules editor may be a Java applet running in a browser (MSIE or NN) on the client machine such as the computer 550 shown in FIG. 2A.

According to an exemplary embodiment, contacts are organized and grouped into a contact folder. The contact(s) may be played back under the control of a contact manager 151 as shown in FIG. 2B.

Figure 2B:
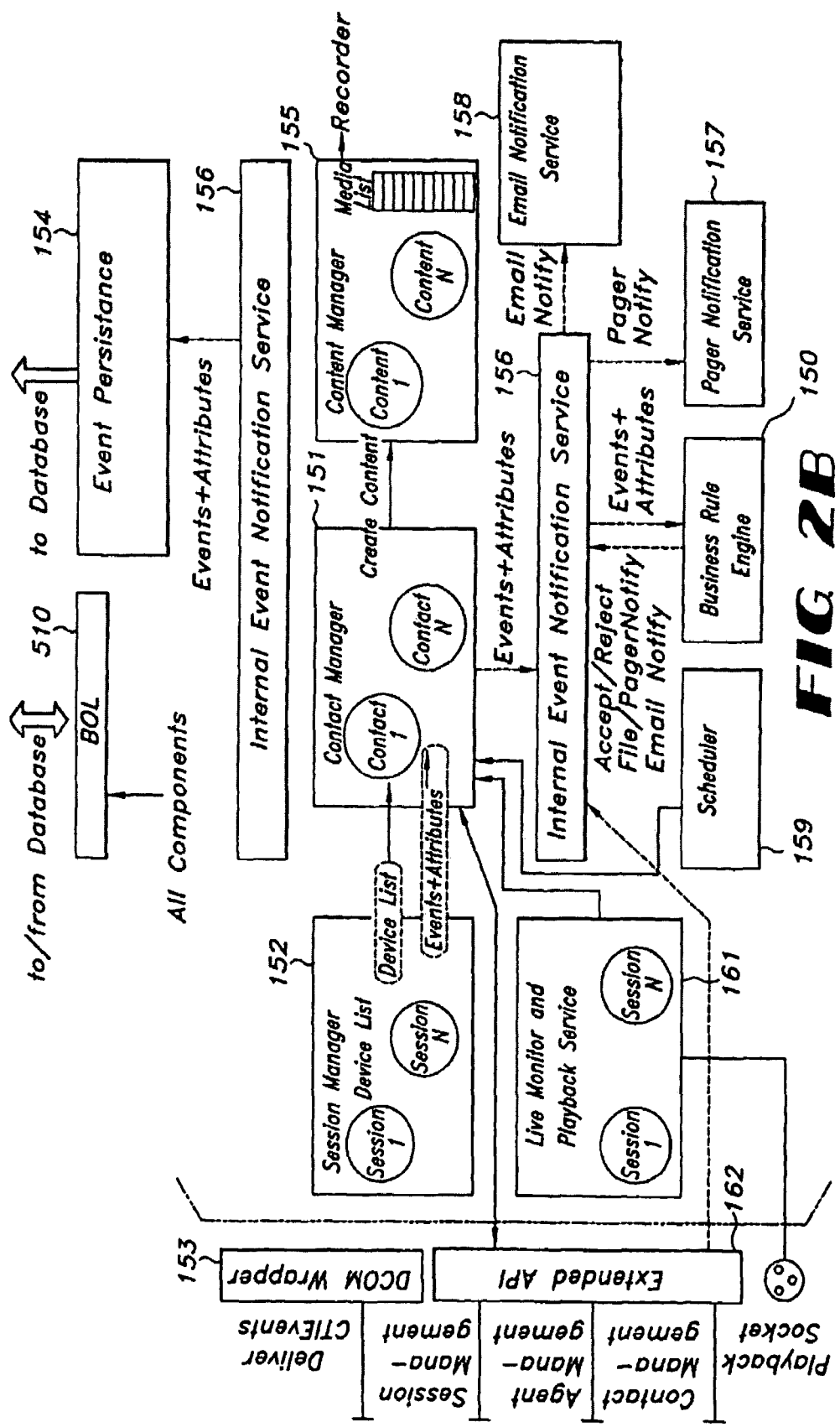

Referring to FIG. 2B, a contact manager 151 is in communication with the business rules engine 150 for mapping business rules to folders. The business rules engine 150, in turn, is in communication with a BOL 510 that communicates with the database, e.g., through the DAL 520.

As shown in FIG. 2B, the contact manager 151 may communicate with the business rules engine via an internal event notification service 156. The internal event notification service 156 controls notification of event occurrences through, e.g., an email notification service 158 for e-mail notification and a pager notification service 157 for page notification. Notification is described in more detail below.

As shown in FIG. 2B, the contact manager 151 is also in communication with the recorder via a content manager 155 that manages how the content in a contact is recorded. Also, the contact manager 151 is in communication with the client via a call or session manager 152 that manages session playback, a DCOM interface 153, and a CTI adapter 555. The contact manager 151 also communicates with the event persistence 154, e.g., through the internal event notification service 156. The contact manager 151 also communicates with the event persistence 154, e.g., through the internal event notification service 156. The event persistence 154 maintains events and permits a user to jump to a point in a contact at which an event occurred. The event persistence 154, in turn, communicates with the database 530.

Also shown in FIG. 2B are a scheduler 159 and a live monitoring and playback service 161. The scheduler 159 coordinates scheduling of event occurrence. The live monitoring and playback service 161 controls playback of recorded data and live monitoring of data and is connected via a playback socket to a user desiring to playback or monitor the data.

Recorded and/or live contacts may be replayed to a user under the control of the contact manager 151 and the live monitor/playback server 161 connected to the user via a playback socket. The live monitor/playback server 161 may be considered as part of the playback module 190 shown in FIG. 1A.

The components to the right of the dashed-dotted lines in FIG. 2B may be implemented, e.g., in an application server 500. Alternatively, some of the components shown to the right of the dashed-dotted lines in FIG. 2B may be implemented as separate entities.

A contact may include voice/graphical user interface (desktop) data, an e-mail message or a web transaction. A list of contacts may be displayed to a user for playback, as shown, e.g., in FIG. 6A described below and in more detail in the afore-mentioned U.S. patent application Ser. No. 11/388,944, entitled "Methods and Systems for Categorizing and Cataloguing Recorded Interactions" and filed Mar. 23, 2006.

When a user selects a contact from the contact list page in the contact module, a new browser window may be displayed as shown in FIGS. 3A-3D. The browser contains an applet that displays all the events for the contact. The applet may also contain a player.

According to an exemplary embodiment, each event recorded in a contact may be assigned an event identifier. This may be in the form of a time code or a timestamp. For example, voice data may be given a time stamp, and text data may be given a time code.

For playback of events, a list of events may be displayed via a player in sequence on an event list, e.g., top to bottom, in the order in which the event time-stamp occurs. This is illustrated, e.g., in FIGS. 3A and 3B, which show an event list of e-mail events, and in FIGS. 3C and 3D, which show an event list of call events.

The screens shown in FIGS. 3A-3D, may be divided into two parts, e.g., a right pane and a left pane. According to an exemplary embodiment, the left pane contains the contact name and the event list. The event list may be scrollable. The right pane contains one or more tabs. One tab may labeled content, and the other tab may be labeled attributes.

When the event list screen is first opened, the user may be presented with the contact name at the top of the left pane and a list of events below the contact name on the left pane. The first event may be preselcted automatically, and its content table may be visible in the right pane.

The interface allows all events associated with a contact to be displayed. If the user does not have security privileges to the events, they may not be displayed.

Referring again to FIGS. 3A and 3C, when a user selects an event name in the left pane, the right pane displays the "content" tab open, and the "attributes" tab behind it. Upon selection of the content tab, the screen shown in FIG. 3A (for e-mail events) or FIG. 3C (for call events) is displayed. Upon selection of the attributes tab, the screen shown in FIG. 3B (for e-mail events) or FIG. 3D (for call events) is displayed. On the attributes tab, all the attributes of the event are displayed, including the attribute name and value. Also, right mouse clicking on an event may cause the attributes of the event to be displayed.

According to an exemplary embodiment, the display may be different depending on the type of contact.

For example, if the contact is an e-mail message, the player has the ability to show information for each event in the contact in text format. The e-mail contact may be stored in the event as an attribute. There is no content to display for e-mails.

An e-mail event, in most cases, contains the text of an e-mail message. However, this is not always the case. For example, if an e-mail does not reach its destination, then this would correspond to some event but there would not necessarily be an e-mail message associated with the event. Some text may be displayed describing the event. The text of an e-mail message may be obtained from the corresponding attribute.

Figure 3A:
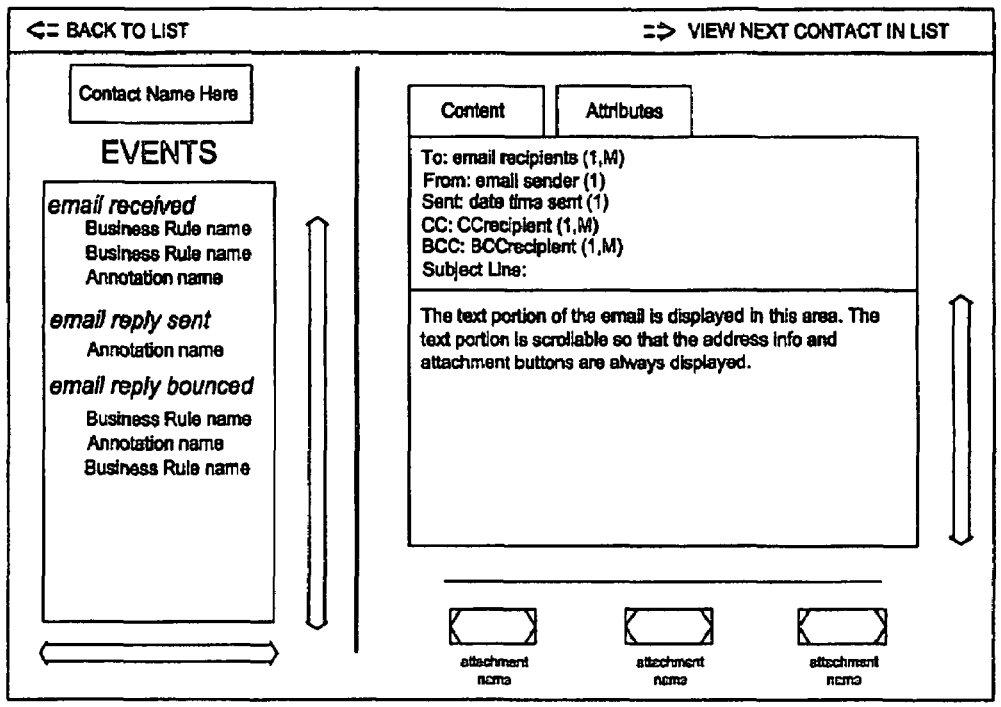
FIGS. 3A-3D illustrate exemplary screens for presenting recorded events to a user.

If the event is an e-mail event, and the address and text attributes are present, the re-constructed email may be displayed in the "content" tab, as shown, e.g., in FIG. 3A. The content includes the re-constructed email, including addressing information and the e-mail text, with some icon representation of any attachments. The applet shows a list contains all the events/emails in a chain. An e-mail may be displayed by selecting it from the events/email list. If the e-mail cannot be reconstructed, the message "there is no available content for this event" may displayed instead.

Figure 3B:
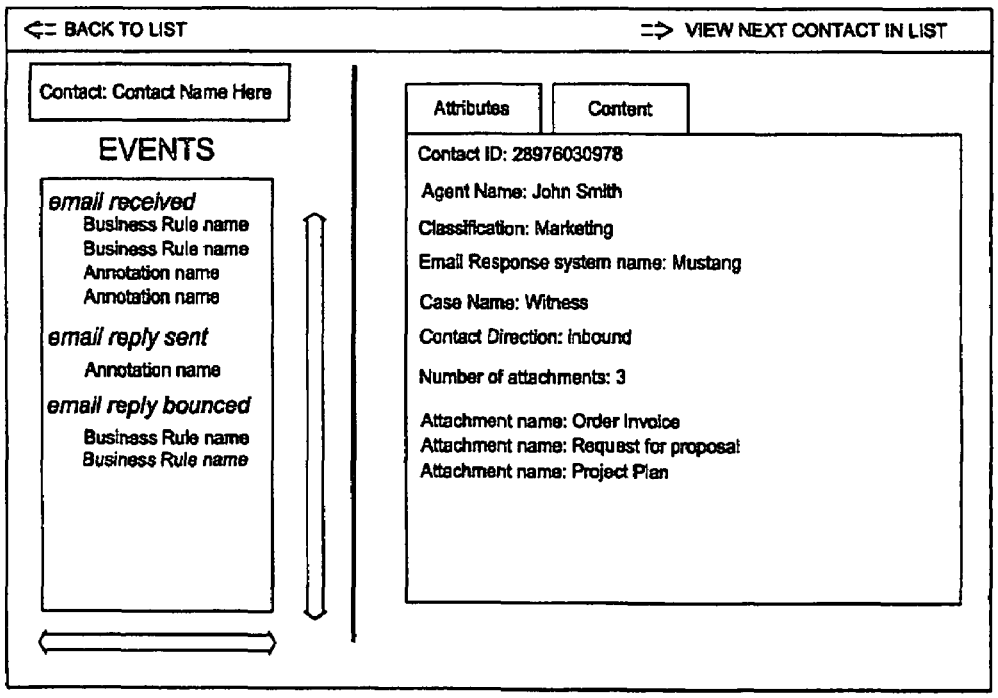

In the content tab, shown in FIG. 3B, the event attributes may include anything. It the attributes contain the email address an text attribute, the e-mail may be reconstructed to include to: information, which may include many names separated by semicolon, a sender, the date/time sent, a cc recipient string, a bcc recipient string, the subject line, the email text, which may be scrollable, and any attachments. If it is not possible to reconstruct the email from the attributes present for the event, a message such as "no viewable content exists for this event" may be displayed in the content window.

Figure 3C:
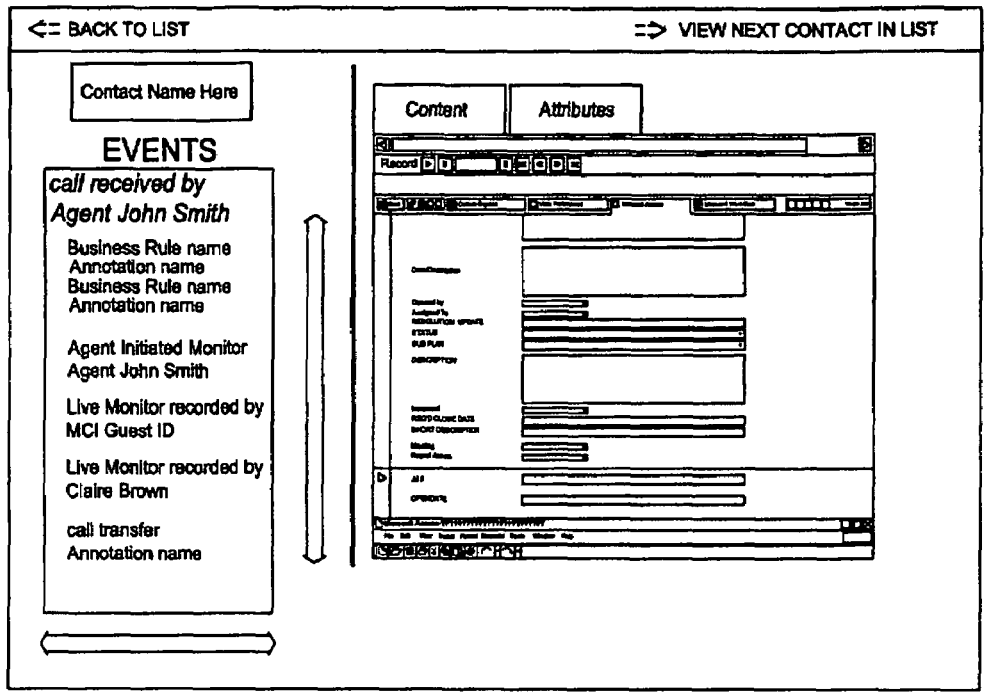
Figure 3D:
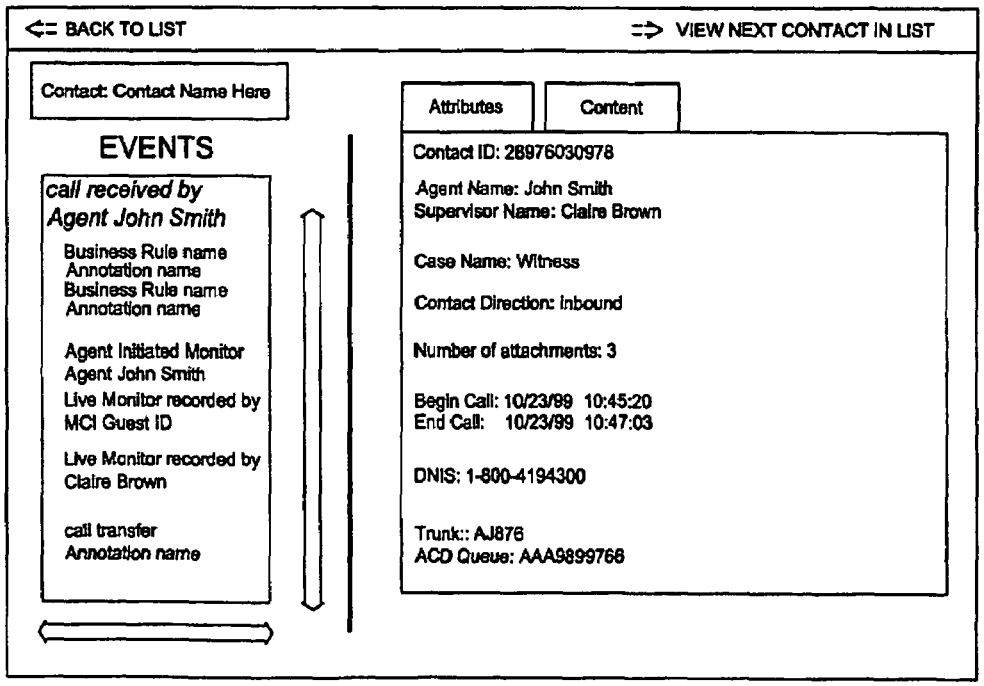

If the contact is a voice/graphics user interface contact, e.g., a call, content and attribute data may be displayed as shown in FIGS. 3C and 3D, respectively. The these types of contacts, the player has the ability to play the voice/graphical user interface data for all events in the contact. This includes all annotations and bookmarks. The content of the agent desktop (if any) may be displayed on the screen 3C.

Figure 4A:
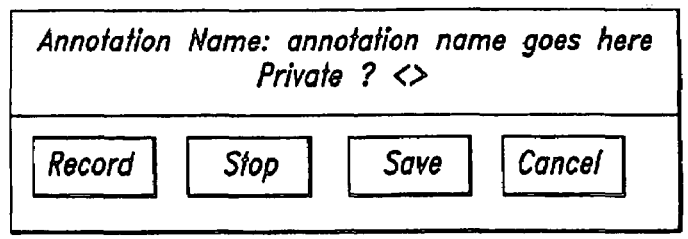
FIGS. 4A-4E illustrate exemplary screens for annotating data.
Figure 4B:
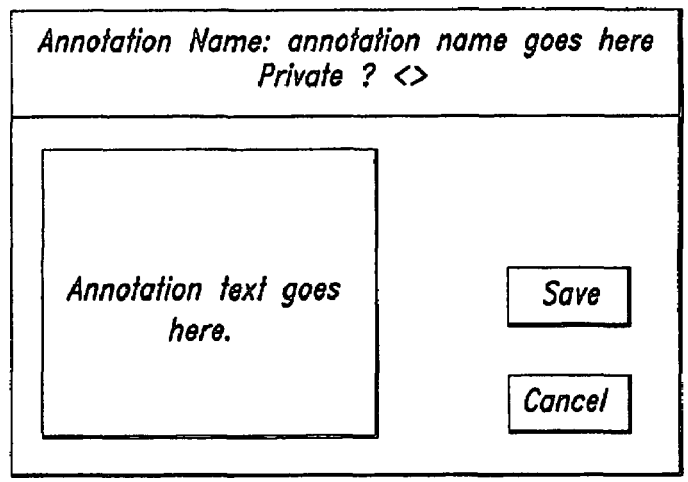
Figure 4C:
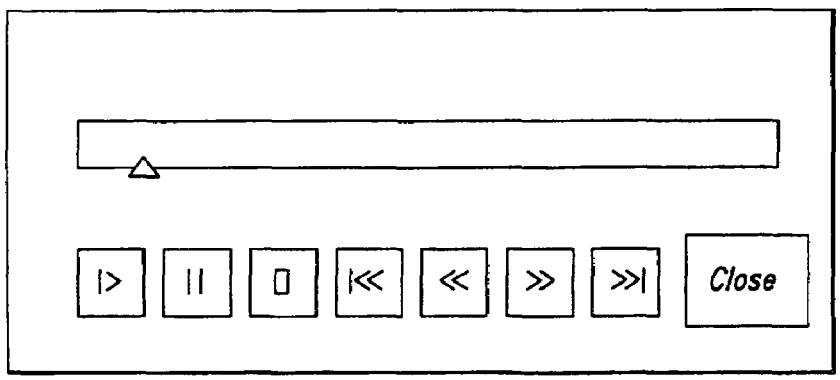

In addition to the content screen shown in FIG. 3C, controls for play, pause, stop, fast forward, and rewind may be displayed along a progress bar as shown, e.g., in FIG. 4C. The user may use any of the controls to navigate through playback. Any action requested applies to both voice and graphical user interface data. A pointer representing the relative position of the listener in the contact may be displayed on the timeline bar. Also, by selecting an event in the list, the user may jump to a specific location in playback.

Once a contact has been played back, an indicator may be set that the contact/session has been reviewed. This indicator may be stored as a value in the database. An icon representing the reviewed/unreviewed status may appear on the contact list of contacts.

There may be a limit to the number of contacts that may be recorded without having been reviewed. To keep track of unreviewed contacts, in addition to setting an indicator, the count of unreviewed sessions may be decremented by one. This prevents contacts continually being saved without the events being reviewed. The unreviewed contact counter may be stored in the database.

For contact events, in the left pane the event name may be preceded by one or more icons which indicate the type of media involved in the event, whether the media is voice and GUI, voice only, or e-mail. An example may be business rule triggered events or annotations. Annotations may include voice and/or text. Business rule trigger events have no icons.

If one or more business rules have been triggered on this contact, the name(s) of the business rule(s) triggered may be displayed. If the user selects a business rule name from the left pane, the content tab in the right pane displays the content of the event which triggered the business rules. If no content is available, e.g., because the business rules was triggered after a call, a message "no viewable content for this event" may be displayed. If the event was a voice event, play may begin at the point where the business rule was triggered, e.g., at the timestamp in the contact content.

In addition to playing back recorded contacts between a server and a user, agent initiated monitoring (AIM) recorded contacts may be played back. Also, live monitoring may be provided, in which a data exchange is played back as it occurs.

If AIM recordings have been stored for an event, a caption "agent initiated monitor %agent name% may be listed in the event list, one for each occurrence. If live monitor recordings have been stored for an event, a caption live monitor record by %name-of-person% may be listed in the event list, one for each occurrence.

In addition to playing back recorded events and live monitor playback, a user may annotate contacts upon playback. Contact annotation is the process of adding text or voice to a contact during playback.

Figures 6A, 6B:
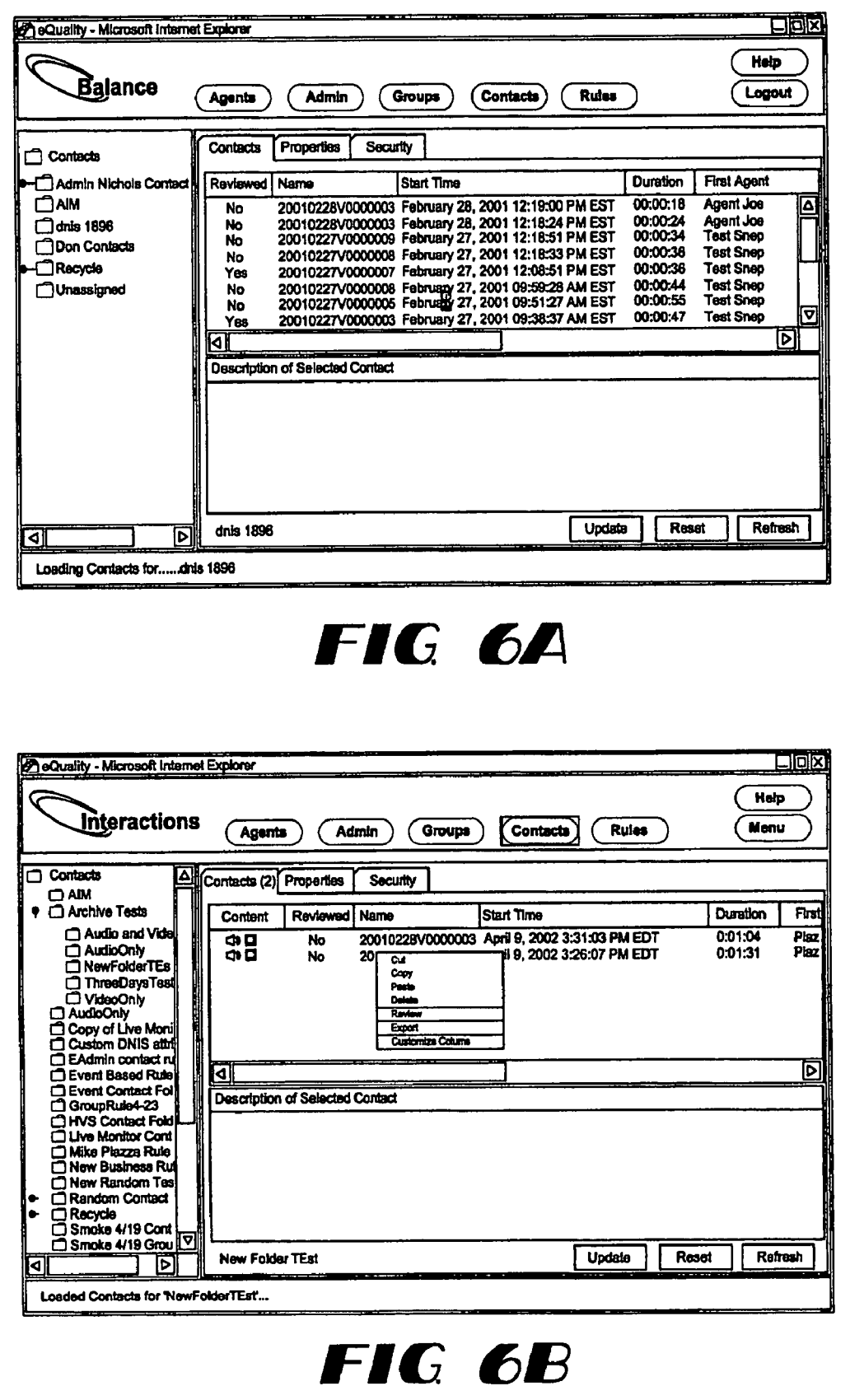

According to an exemplary embodiment, to annotate a contact, a user selects a contact in a contact folder using, e.g., a screen such as that shown in FIG. 6A. This causes the event viewer, such as that shown in FIG. 3A-3D to be displayed. The user may make voice and text annotations to the contact.

The name of each annotation created for a contact may be displayed, unless the annotation is marked private. If the annotation is marked private, it may only appear in the list if the user is also the annotation owner. To the left of the annotation name, an icon may appear to indicate if the annotation is voice or text.

At any point in the replay, the user may add an annotation by selecting "pause" on a player controller, such as that shown in FIG. 4C, and then pressing tools, annotation, create voice/text annotation. Alternatively, the system may automatically pause if the user attempts to create an annotation during play.

If text annotation is requested, an interface such as that shown in FIGS. 4A and 4B for providing text data may be presented to the user. Once the user requests to save the information, the text data is sent to a contact annotation service. The annotation service creates an event and sends it to the event notification server.

Voice annotation may be implemented as follows. If s user is listens to playback on a soundcard, then the voice annotation may be done performed via soundcard. If the user is listening to playback via a phone, then the voice annotation may be performed via phone.

If voice annotation is requested through a phone, a request is made to an annotation service implemented, e.g., in the applications server 500, to record for the agent/extension. For example, the annotation service may use, e.g., the voice card 765 shown in FIG. 7 for receiving requests for annotation. The annotation service passes the agent/extension to the content routing service and requests that recording begin. In an exemplary embodiment, the telephony data manager 760 and the n data manager 770 shown in FIG. 7 may act as the content routing service. The annotation data may be stored in a database. The content routing service returns a globally unique content identity that may be used to refer to the recorded information.

The user indicates that recording is complete via a user interface control. At this point, the user makes a request to the annotation service that records stop for the particular agent/extension. The annotation service forwards this request to the content routing service to stop the recording.

If voice annotation is requested through a soundcard/microphone, the recorded data and its length are passed to the annotation service. This data is forwarded to the content routing service. The content routing service returns a globally unique identifier that may be used to reference the recorded information.

According to an exemplary embodiment, the annotation may be given the date/time stamp of its relative location in the contact. When the annotation is complete, the play may be resumed by clicking the "pause" control again.

The user may also assign a label to the annotation to uniquely and descriptively identify it.

As annotations are added (saved), the event list may be dynamically updated to include the new annotations.

Figure 4D:
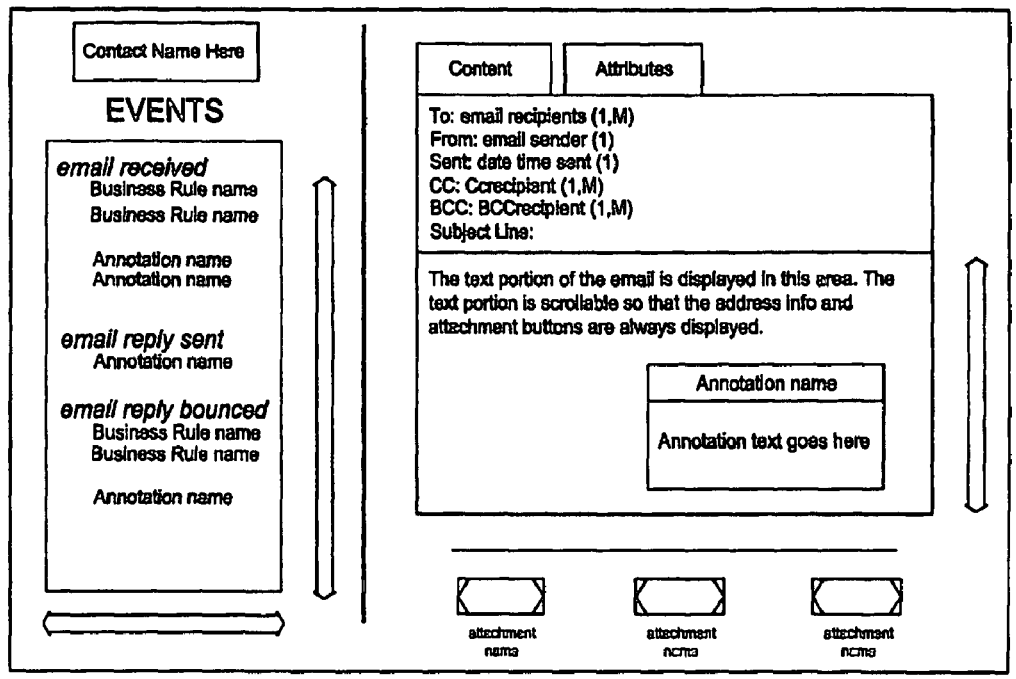

A user with appropriate access may view an annotation. To view an annotation, the user selects the annotation in the event list. The annotation may then be displayed (if it is text) or played back (if voice). An example of an annotation to an e-mail message is shown in FIG. 4D.

Figure 4E:
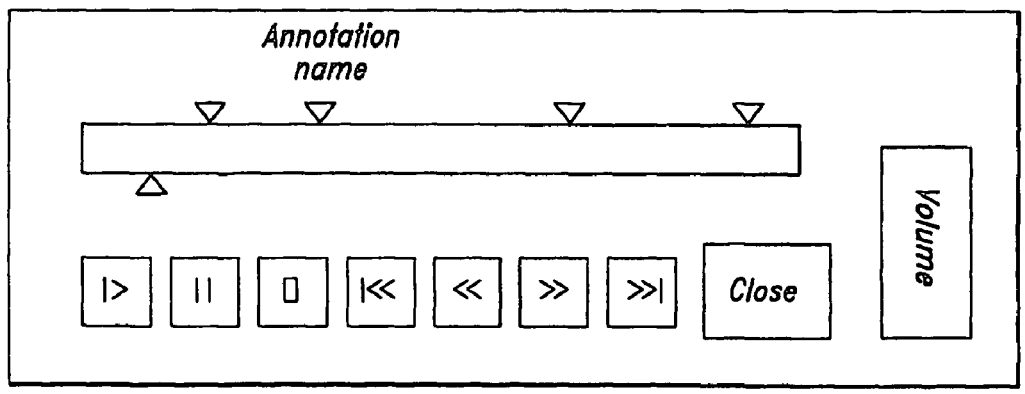

In addition to viewing annotations by selecting annotations in the event list, annotations may be viewed using, e.g., a player control including annotation names as shown in FIG. 4E. When a mouse is moved over the inverted triangle representing an annotation, the name of the annotation appears. The triangle under the timeline bar represents the relative position of the listener in the contact.

In addition to annotation, the ability to notify parties is included. Notification may be implemented using a system such as that shown in FIG. 2B, using the internal event notification service 156.

Figure 5A:
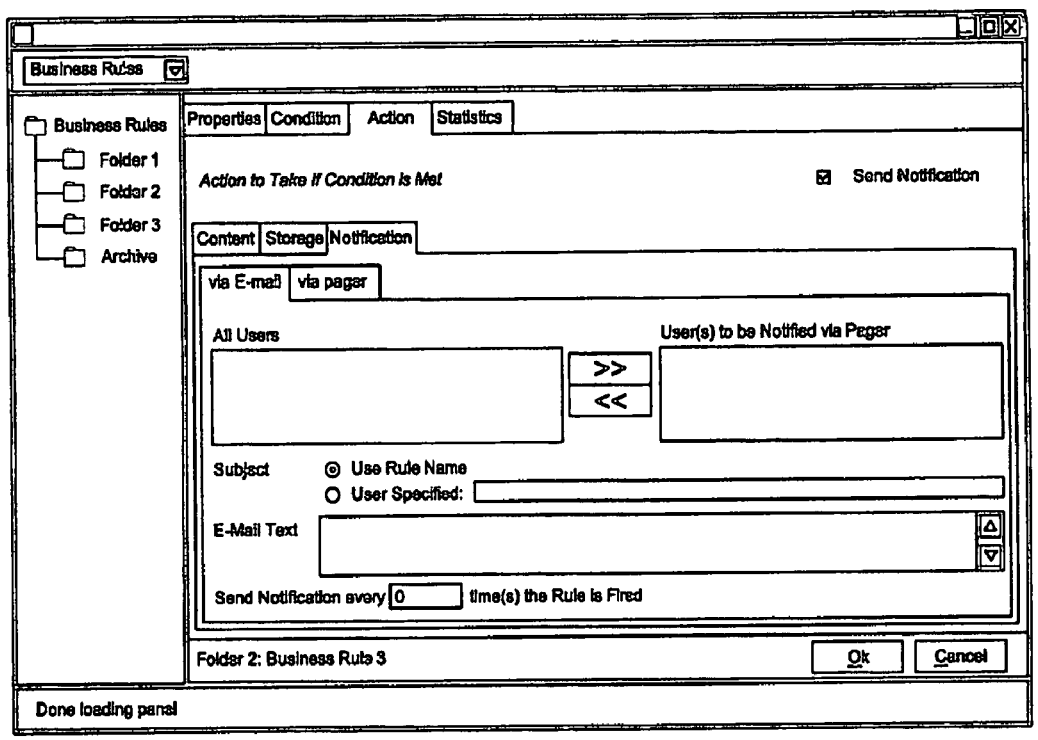
FIGS. 5A and 5B illustrate exemplary screens used for notification.
Figure 5B:
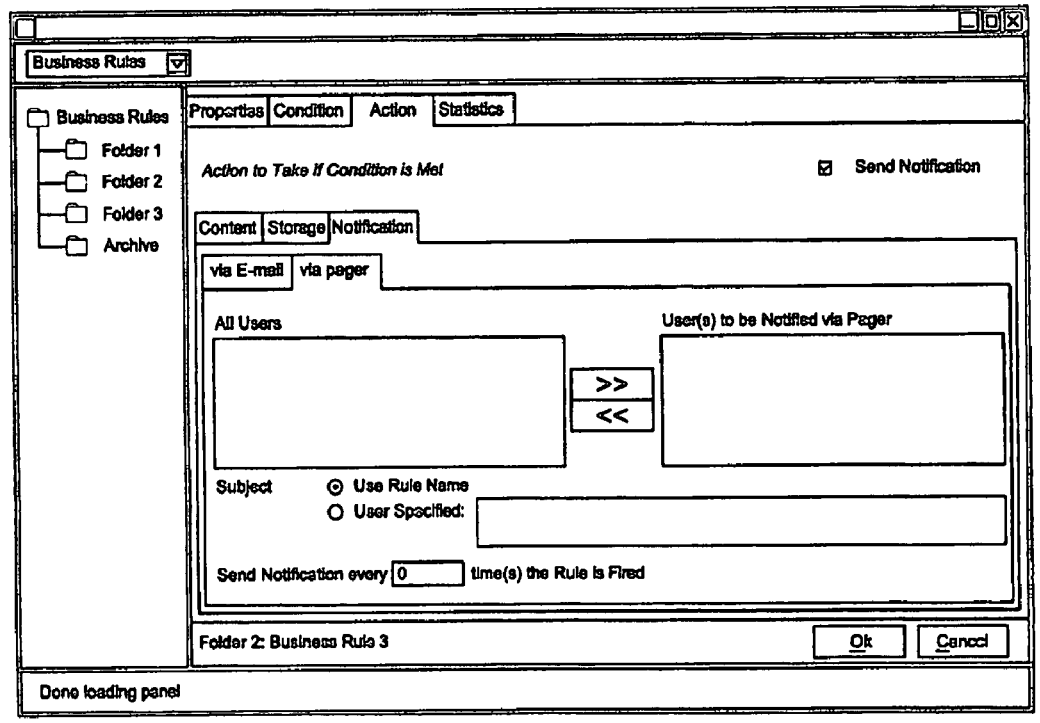

For notification, property screens such as those shown in FIGS. 5A and 5B may be displayed. Referring to FIGS. 5A and 5B, if notification is desired, the send notification checkbox may be checked or the notification tab may be selected, activating the notification tab on the property sheet.

According to an exemplary embodiment, there may be different types of notifications, e.g., e-mail notification, page notification, PDA device notification, WAP device notification, 3G wireless cellular phone notification, etc. For simplicity of illustration, only e-mail notification and page notification are described below.

The notification pages shown in FIGS. 5A and 5B correspond to e-mail notification and pager notification, respectively. In the exemplary implementation shown in FIG. 2B, e-mail notification is controlled by the e-mail notification service 158, and pager notification is controlled by the pager notification service 157.

According to an exemplary embodiment, notification follows a similar routine whether it occurs via e-mail, pager, PDA, WAP, 3G or any other suitable device. First, the users who will receive the notification must be assigned. For setting notifications, it is assumed that the notification recipient's information is defined within the user profile and that this information is requested when necessary. For example, for e-mail notification, it is assumed that the recipient's e-mail address is defined in the user profile.

User names may be multi-selected from the left-hand user list in the screen shown in FIGS. 5A and 5B, and the users may be assigned to the notification list by clicking the top button. For advanced users, simply double-clicking on the user name in the left-hand list may add the name to the right-hand list. The opposite also holds true. User names may be multi-selected in the right-hand list and the bottom button clicked to remove them from the notify list, or the name may be double-clicked.

For e-mail notification, there may be two options for the subject line: the rule's name may be used, or some user specified text may be used. The body of the e-mail may be entered into the text box labeled for e-mail text. A notification frequency may be set to indicate how often the user(s) should be sent an e-mail message when the rule is fired. This may be tracked by the business rule engine.

As shown in FIG. 5B, the configuration for notification via pager is very similar to that for e-mail. The assignment of users follows the same method. Where the e-mail definition dealt with a subject line, the pager setup requires the actual text to be sent to the pager. The options are to either use the rule name or to use some user-defined text. The paging time constraint restricts the time that users may be paged to a specific time range. Again, as with e-mail notification, a notification frequency may be set.

Notifications are particularly useful when interactions are played to an entity outside of the enterprise. For example, an entity outside of the enterprise using, e.g., Windows media player may desire to access the data. This entity may be, e.g., a supervisor interested in viewing or personnel in other parts of the company. This outside entity may not have equipment necessary to playback the recorded interactions in the format in which they are stored in the enterprise, e.g., VOX format for voice data and proprietary DAT format for text data. Also, since the data may contain media of different types, the data needs to be synchronized before being presented to the media player.

Thus, according to an exemplary embodiment, voice and data (e.g., desktop content) of a contact may be converted to any audio-video format easily accessible without requiring special hardware. Examples of such an audio-video format into which the contact may be converted include an audio video interleaved (AVI) format, a Moving Pictures Expert Group (MPEG) format, etc.

The converted file may be saved in an HTML format and associated with a hyperlink or Uniform Resource Locator (URL) that is accessible by launching a media player. This is described in more detail below. Alternatively, the user may choose to email the converted file, and the converted file may be provided as an attachment to an email.

For exporting a contact, the contact folder that contains the contact to be exported may be selected via a contact tab such as that shown in FIG. 6A. Once the contact is selected, the export feature may be selected using a contact editing pop-up menu, such as that shown in FIG. 6B.

Rather than selecting a contact to export using the contact tab, the playback event viewer may also include a button for "export contact". This may only be visible if a user has permission. The playback event viewer may also contain validation to allow this on CTI contacts only, not e-mail or web contacts. An error message may be generated if validation fails.

If the "export contact" button is selected while the contact is being replayed, the replay may be paused until the conversion is complete, and the user has specified the file name and path for the converted file. Then, replay may resume.

Figure 6C:
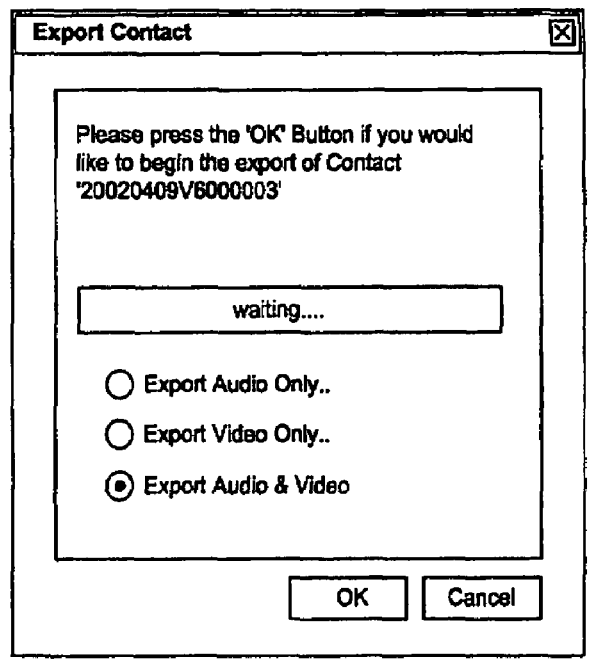
Figure 6D:
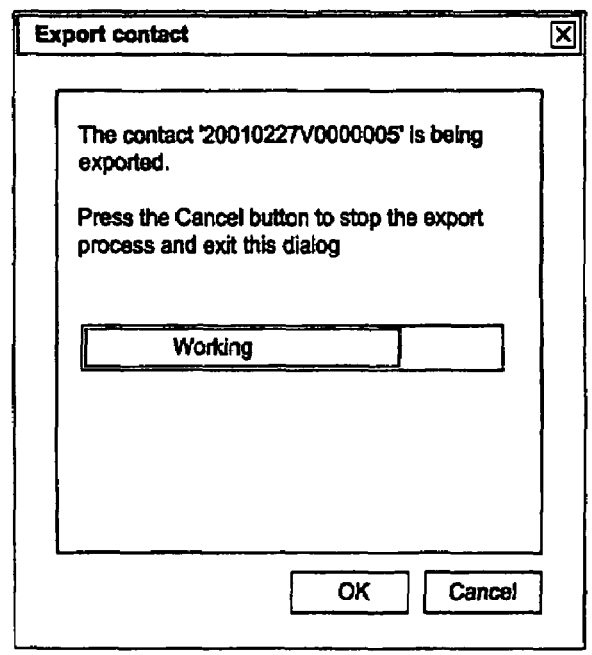

Using the dialog box shown in FIG. 6C, a user may decide whether to export audio data only, video data only, or audio and video. The selected contact is then converted into a format compatible with the multimedia player. While the conversion occurs, a window may display the progress, as shown in FIG. 6D. If conversion of the contact fails, a message may be generated.

Figure 6E:
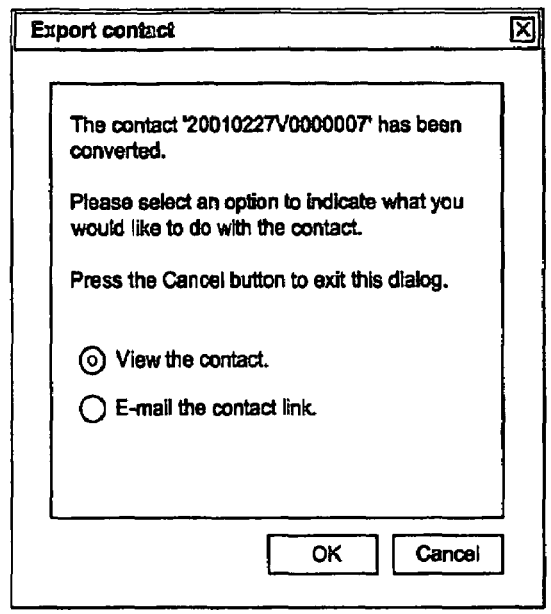

When the conversion is complete, the converted contact may be saved, and a hyperlink may be created for the contact using the screen shown, e.g., in FIG. 6E. The file type may be passed back to the browser, which may then display a "file, SaveAs" box. The user selects the path and name. For an AVI file, the extension is forced to "avi".

If the save is not successful, an error message may be displayed. If successful, the "file Save As" box is closed, and replay resumes if the contact was paused in replay. Otherwise, direction from the user is awaited.

Figure 6F:
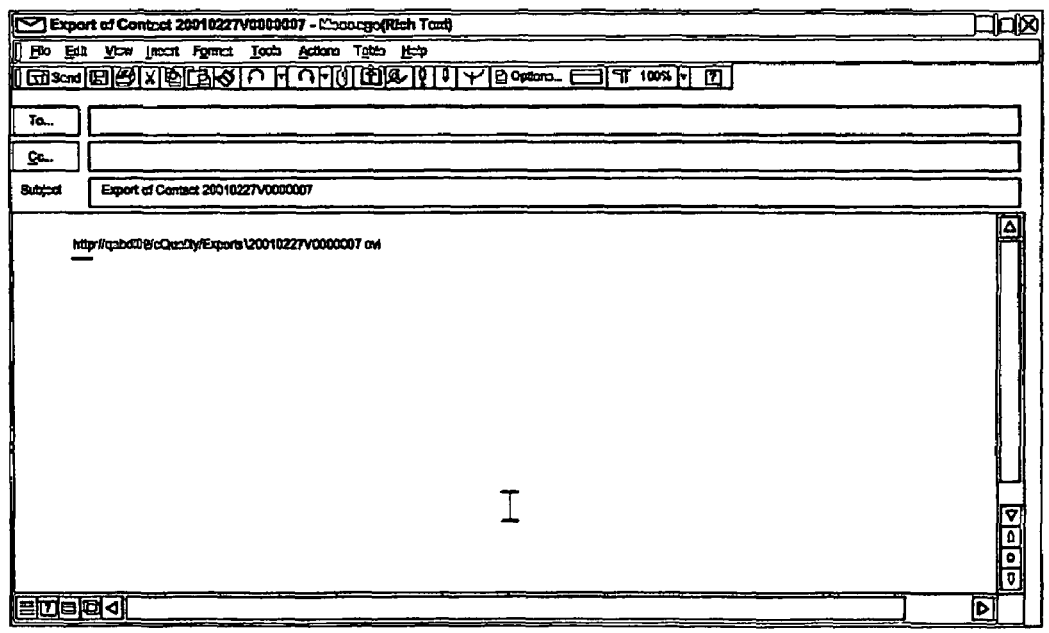

A user may decide to view the contact or e-mail the link to the contact using a dialog box such as that shown in FIG. 6F. To e-mail the contact link, the user may be presented with a default mail client set to "composed", and the unique contact name may be displayed in the subject line as shown in FIG. 6F. The user completes the "to" field in the e-mail window and any other information in the body of the message and selects "send". The hyperlink link for the contact may then be sent to the e-mail addresses.

Figure 6G:
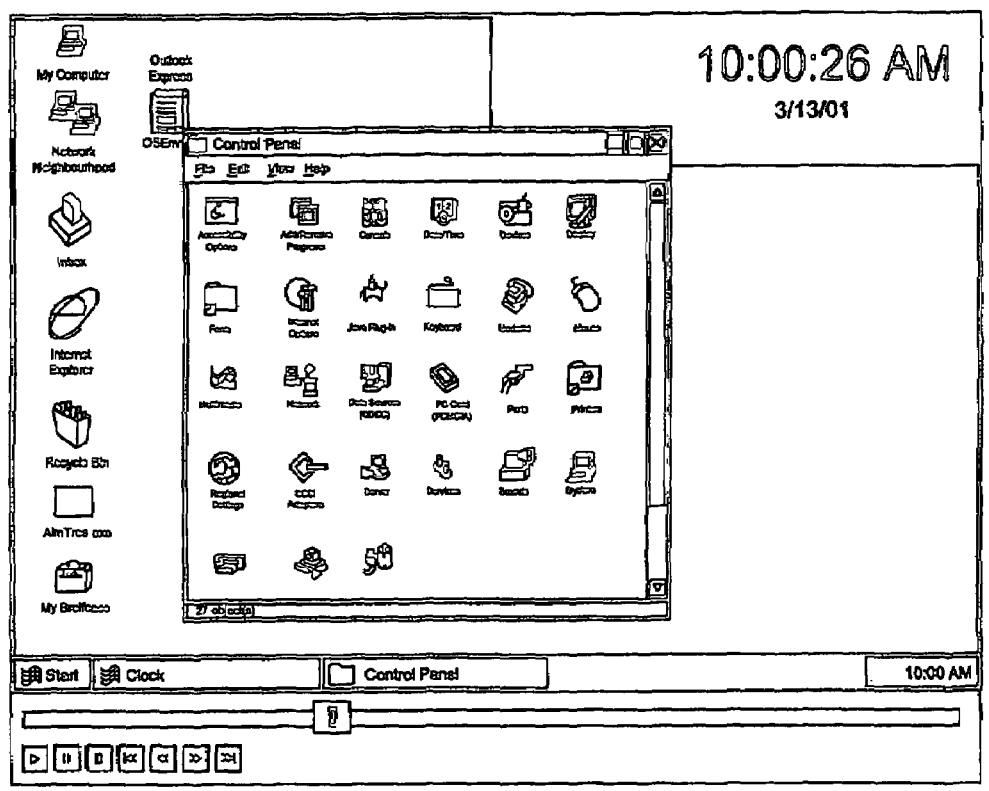

A multimedia player may then be launched from a machine to view the contact by linking to that URL. The media player may be launched from a control panel screen, such as that shown in FIG. 6G. The converted contact may be replayed by commercially available media player, which may be chosen by the customer and obtained at the customer's option.

Contacts may be retrieved from an archives and converted to an audio-video format, in a similar fashion.

An audit trail data of converted contact may be available for reporting, at customer's option. The audit trail may include information indicating what entity converted the file, the contact name, and the date. The audit trail may be handled similarly to reporting.

FIG. 7 illustrates a system for synchronizing multimedia data according to an exemplary embodiment. In FIG. 7, control signal paths are represented by dotted lines, and data signal paths are represented by solid lines.

As shown in FIG. 7, a recording interface 705 receives signals from a recorder server 540. Also, the recorder interface 705 is connected to voice card drivers 715 via a telephone network connection manager 710 for receiving control data.

The recorder interface 705 outputs control signals to the central unit 700 which, in turn, outputs control signals to the LAN data managers 730 and 735, the telephony data manager 760, and the n data manager 770.

A node manager 720 starts various processes performed by the components and monitors their progress. A time synchronization 725 unit provides a synchronization signal to all components so that the playback of the recorded contacts is synchronized.

The LAN data manager 730 receives captured screen data, e.g., from an agent's desktop from screen data record units 740 and 745. This data may be stored in a local storage 775 and then transferred to a database via the data store manager 780.

The telephony data manager 760 receives captured voice data via a voice card driver 765. This data may also be stored in the local storage 775 and transferred to a database via the data store manager 780. Also, this data may be provided, e.g., back to the agent for live monitoring.

Screen data in the local storage 775 may be provided to the LAN data manager 735 for playback, e.g., to an agent or a supervisor, via the playback module 750. The playback module 750 synchronizes data of different media types, e.g., voice data and text data. This may be performed by matching, e.g., the time codes of the voice data and the time stamps of the text data.

The playback module 750 also converts the multimedia data into an audio-video format suitable for a multimedia player, e.g., an AVI format or an MPEG format. The playback module then exports the data to local storage 755. When a media player is launched from, e.g., a browser outside the enterprise, the converted audio-video format file may be retrieved from the local storage 755 and played back.

Both recorded data and live data may be processed in the playback module 750.

A n data manager 770 receives data from the local storage 775 and outputs data to other applications, as desired.

All of the components in FIG. 7 may be implemented in the applications server 500.

According to exemplary embodiments, captured multimedia data may be recorded and stored, annotated, and exported for playback to any media player. Also, users may be notified upon recording and storing.

It should be understood that the foregoing description and accompanying drawings are by example only. A variety of modifications are envisioned that do not depart from the scope and spirit of the invention. The above description is intended by way of example only and is not intended to limit the present invention in any way.

What is claimed is:

1. A method for presenting events associated with recorded data exchanged between a user and a server, wherein the recorded data comprises a record of a voice contact session occurring between a center agent and the user via said at least one server and wherein the user is a customer, the method comprising the steps of:

defining a set of events within the voice contact session associated with the recorded data exchanged between the customer and the call center agent, wherein only data that satisfies predetermined business rules is recorded;

assigning an event identifier in the form of a time stamp or time code to each event within the set, wherein the set of events comprises events occurring during the voice contact session;

associating each event identifier with a portion of the voice contact session exchanged between the customer and the call center agent that correspond to the event represented by the event identifier;

displaying at least one portion of the voice contact session to the user in the form of a call timeline during playback of the recorded data, wherein the call timeline includes the event identifiers associated with the at least one portion of the voice contact session, the event identifiers being arranged in time order; and selecting an event for presentation from the call timeline by selecting the event identifier associated with the at least one portion of the voice contact session associated with the recorded data exchanged between the customer and the call center.

2. The method of claim 1, wherein the call timeline is annotated by the event identifier, the event identifiers indicating on the call timeline a point during the voice contact session when an event associated with the event identifier occurred.

3. The method of claim 1, wherein the call timeline shows a plurality of calls handled by the agent during a period of time, each initiation of the voice contact session being marked by an event identifier noting the start of the contact, and each termination of the voice contact session being marked by an event identifier noting the end of the voice contact session, as well as any events occurring during the voice contact session.

4. The method of claim 1, wherein the predetermined business rules comprise at least one event identifier, wherein the method further comprises triggering a recording device upon detection of an event associated with said at least one event identifier in accordance with the predetermine business rules.

5. The method of claim 1, wherein the event identifier is associated with an annotation entered by one or more of the user, the agent, or a supervisor.

6. A computer implemented method for graphically presenting events associated with recorded data exchanged between a user and a call center agent receiving calls via a server, the method comprising:

defining a set of events within a voice contact session associated with recorded data exchanged between the user and the call center agent, each event within the set represented by an event identifier in the form of a time stamp or time code, wherein the set of events comprises events occurring during the voice contact session;

associating each event identifier with a portion of the recorded data exchanged between the user and the call center agent that correspond to the event represented by the event identifier;

displaying the recorded data of the voice contact session to the user in the form of a call timeline for playback, wherein the call timeline comprises an ordered series of event identifiers associated with the voice contact session; and selecting an event for presentation from the call timeline by selecting the event identifier associated with at least a portion of the recorded data exchanged between the user and the call center agent that corresponds to the event represented by the selected event identifier;

wherein the recorded data is captured according to predetermined business rules.

7. The method of claim 6, farther comprising triggering a recording device based upon application of the predetermined business rules.

8. The method of claim 7, wherein the predetermined business rules comprise an event identifier, whereby an event associated with the event identifier triggers a recording device to record the voice contact.

9. A graphical presentation system for displaying contact center records, the system being configured to graphically present events associated with recorded data representing a voice contact session exchanged between at least one user and a contact center agent, wherein the contact center agent receives the voice contact session via a server, the system comprising:

means for receiving a set of events, wherein the set of events comprises events occurring during the voice contact session, wherein only data that satisfies predetermined business rules is recorded;

means for determining when each event within the set occurs during the voice contact session;

means for associating an event identifier in the form of a time stamp or time code with the portion of the voice contact session where the event occurs;

means for graphically displaying the recorded data representing the voice contact session in the form of a call timeline during playback, the call timeline comprising an event identifier noting the start of the voice contact session and a call termination as well as any events that occurred during the voice contact session, the event identifiers of events being arranged in time order.

10. The system of claim 9, further comprising means for recording the voice contact session based upon application of the predetermined business rules.

11. The system of claim 10, wherein the predetermined business rules comprise an event identifier, whereby an event associated with the event identifier is used to trigger the recording device to begin or end recording.

* * * * *